(12) United States Patent
Hong et al.

(10) Patent No.: US 6,639,752 B2
(45) Date of Patent: Oct. 28, 2003

(54) HOUSING STRUCTURE OF TAPE RECORDER

(75) Inventors: Sung-hee Hong, Suwon (KR); Jae-kab Seo, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 134 days.

(21) Appl. No.: 09/932,463

(22) Filed: Aug. 20, 2001

(65) Prior Publication Data

US 2002/0020241 A1 Feb. 21, 2002

(30) Foreign Application Priority Data

Aug. 19, 2000 (KR) .......................................... 2000-48098

(51) Int. Cl.[7] .............................................. G11B 15/675
(52) U.S. Cl. ..................................................... 360/96.5
(58) Field of Search ........................................ 360/96.5

(56) References Cited

U.S. PATENT DOCUMENTS 4,145,727 A * 3/1979 Tuninetti .................... 360/96.5
5,815,341 A * 9/1998 Hwang et al. ............. 360/96.5

* cited by examiner

Primary Examiner—Robert S. Tupper
(74) Attorney, Agent, or Firm—Robert E. Bushnell, Esq.

(57) ABSTRACT

A housing structure of a tape player and recorder having a cassette housing and two pairs of link members is installed on both side walls of a deck of the tape player and recorder. The cassette housing is supported on the deck by the pairs of the link members. One of the pair of link members is integrally formed with a shaft connected to one end of the link members in a monolithic structure.

19 Claims, 2 Drawing Sheets

HOUSING STRUCTURE OF TAPE RECORDER

CLAIM OF PRIORITY

This application makes reference to, incorporates the same herein, and claims all benefits accruing under 35 U.S.C. §119 from an application A HOUSING STRUCTURE FOR TAPE RECORDER filed with the Korean Industrial Property Office on Aug. 19, 2000 and there duly assigned Ser. No. 48098/2000.

BACKGROUND OF THE INVENTION

1. Field of the Invention

The present invention relates to a cassette housing structure of a tape cassette player and recorder and more particularly, to a cassette housing structure having two pairs of link members one of which is made in a single body.

2. Description of the Related Art

A cassette housing is supported by a link mechanism on a deck of a tape cassette player and recorder. The link mechanism includes two pairs of link members, each pair having two side links located on each side of a cassette housing and spaced-apart from each other by a length of the cassette housing. Each side link has one end coupled to the cassette housing and the other end coupled to the deck of the player and recorder. Typically, a shaft is coupled to both the cassette housing and the one end of the two side links of one pair of link members in order to couple the link member to the cassette housing, maintain the length between the spaced-apart link members, and press the cassette housing downwardly during placing of the cassette housing on the deck of the cassette player and recorder. However, it is very inconvenient to assemble the shaft into both the cassette housing and the one end of the side links simultaneously. The assembly process becomes complicated for securely connecting the shaft to the cassette housing and the link member. Moreover, if one end of the shaft is detached from or protrudes from the link member and the cassette housing, the one end of the shaft prevents the cassette housing from moving within the deck, thereby causing malfunction of the tape cassette player and recorder.

A conventional tape cassette housing used for a tape cassette player and recorder, such as a camcorder, is shown in FIG. 1 and includes a housing structure having a cassette housing 20 into which a tape cassette 10 is inserted, two pairs of link members 21 and 22 coupled between cassette housing 20 and a deck 30 and moving between an unloading position for receiving or releasing the cassette and a loading position for placing the cassette on the deck for a play mode or a record mode, and a shaft 40 having both ends connected to the cassette housing 20. After tape cassette 10 is inserted into cassette housing 20 in a direction indicated by an arrow A, cassette housing 20 moves in a direction indicated by an arrow B along with rotation of link members 21 and 22 for locating the cassette housing 20 on deck 30 while accommodating tape cassette 10. Shaft 40 is rotatably inserted through holes formed on both side plates of cassette housing 20.

Since shaft 40 is separately provided for assembly into housing 20, the assembling process of the above-described housing structure becomes complicated. Moreover, if one end of shaft 40 penetrates through the side plates of cassette housing 20 and protrudes from the side plate and the link member, the protruding portion of the one end of the shaft may not provide link members 21 and cassette housing 20 with strength and may not prevent cassette housing 20 from being distorted.

SUMMARY OF THE INVENTION

It is an object of the present invention to provide an improved link mechanism supporting a cassette housing structure on a deck of a tape cassette player and recorder.

It is another object to provide a link mechanism supporting a cassette housing so as to reduce the number of components for the link mechanism and the cassette housing.

It is yet another object to provide a link mechanism supporting a cassette housing so as to reduce the time for assembling the link mechanism and the cassette housing.

It is still another object to provide a link mechanism supporting a cassette housing so as to prevent the cassette housing from causing a malfunction of the link mechanism and the cassette housing.

It is a further object to provide a link mechanism supporting a cassette housing so as to provide the link mechanism and the cassette housing with strength.

It is also an object to provide a link mechanism supporting a cassette housing so as to prevent the link mechanism and the cassette housing from being distorted when an external impact is exerted on the cassette housing and the link mechanism.

These and other objects of the present invention may be achieved by a link mechanism having two pairs of link members supporting a cassette housing on a deck of a cassette player and recorder. One of the two pairs of link members is integrally formed with a shaft in a single body.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, and wherein.

DESCRIPTION OF THE INVENTION

Figure 1:
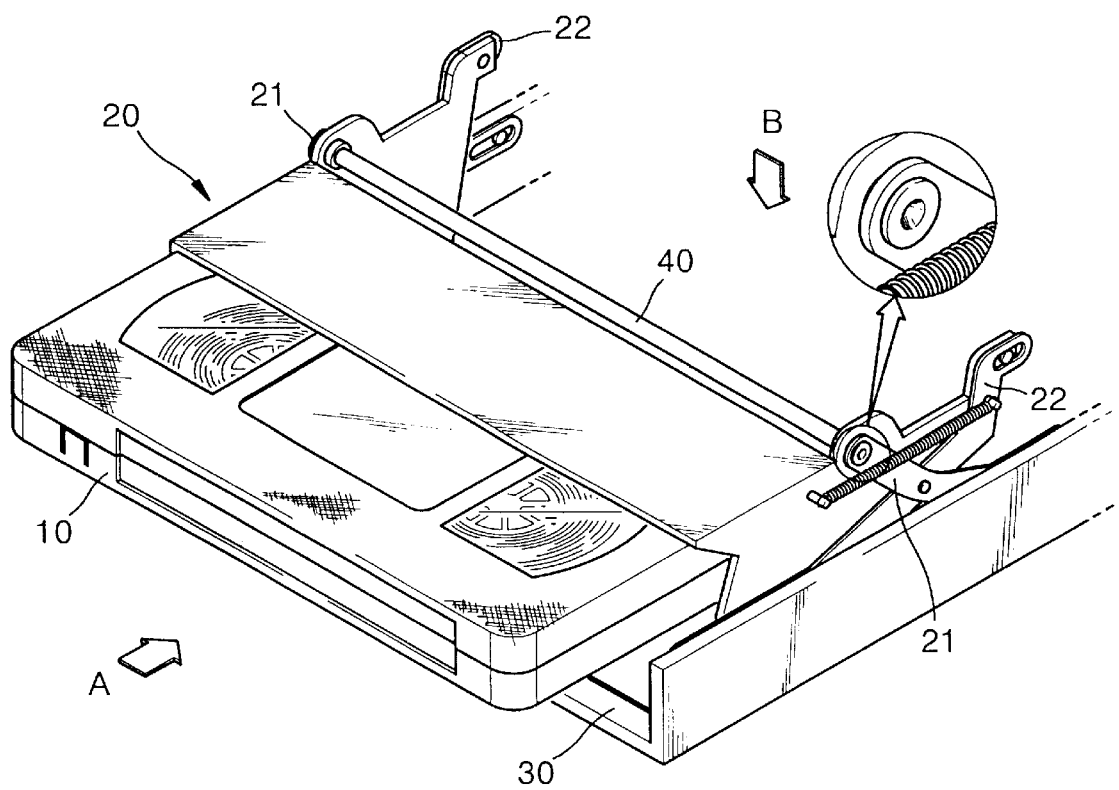
FIG. 1 is a perspective view of a conventional cassette housing structure of a tape cassette player and recorder.
Figure 2:
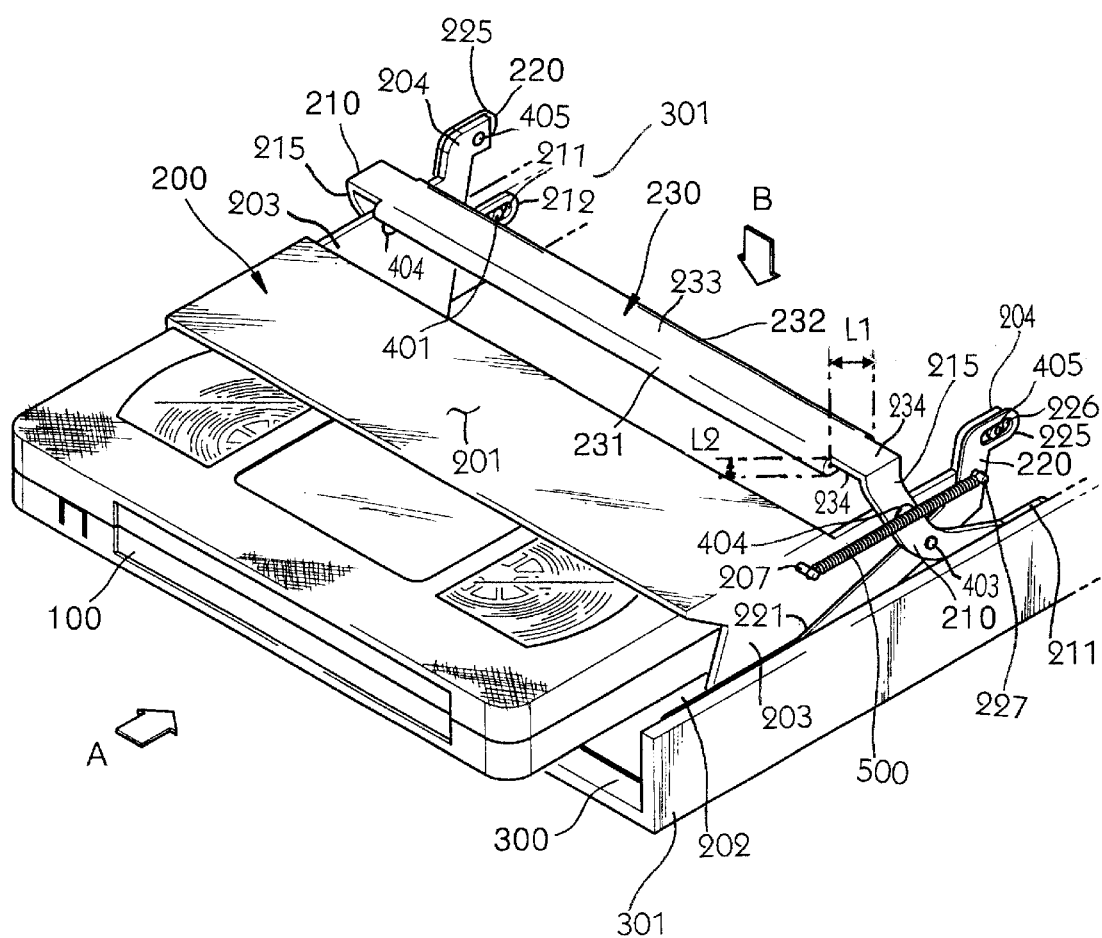
FIG. 2 is a perspective view of a housing structure of a tape recorder constructed by the principle of the present invention.

Referring now to FIG. 2, a cassette housing 200 defines a top plate 201, a bottom plate 202, and two side plates 203 providing a space to accommodate a tape cassette 100. Cassette housing 200 is supported by two pairs of link members 210, 220 slidably connected to sidewalls 301 of a deck 300. Link member 210 is integrally joined by a longitudinal shaft or plate 230 in a single body. After tape cassette 100 is inserted into cassette housing 200 in a direction indicated by an arrow A, cassette housing 200 moves to a loading position for positioning cassette housing 200 onto deck 300 in a direction indicated by an arrow B by rotation of link members 210, 220 in opposite directions, respectively. A power source not shown may be coupled to link member 210, 220 to move in the direction of arrow B, or cassette housing 200 manually moves by a user pressing cassette housing 200 in the direction of arrow B.

The advantage of the present invention is derived from provision of longitudinal shaft 230 integrally formed with the pair of link members 210 in a monolithic structure. Longitudinal shaft 230 is incorporated into the pair of link members 210 by a pressing process. Longitudinal front and rear edges 231 and 232 of longitudinal shaft 230 are preferably bent, as shown in FIG. 2, downwardly and inwardly to have a longitudinal opening 234 formed between free ends of longitudinal front and rear edges 231, 232. A longitudinal main body 233 of longitudinal shaft 230 has a width L1 while longitudinal front and rear edges 231 and 232 have a width L2 less than width L1 of longitudinal main body 233 of longitudinal shaft 230. Longitudinal front and rear edges 231, 232 increase the thickness and the strength of longitudinal shaft 230, and prevent longitudinal shaft 230 from being warped and distorted when an external shock is exerted on longitudinal shaft 230 or cassette housing 200.

Link member 210 integrally formed with longitudinal shaft 230 in the monolithic structure is prepared to be coupled to link member 220 and installed on cassette housing 200, and thereby the assembling process is simply completed without the complicated process of inserting longitudinal shaft 230 into holes of cassette housing 200 and fixing shaft 230 on link member 210.

Ends 211, 221 of link members 210, 220 are slidably connected to sidewall 301 of deck 300. Pins 401 formed on sidewall 301 are slidably inserted into openings 212 formed on the ends 211, 221 of link members 210, 220. The other ends 215 of link members 210 are joined by longitudinal main body 233 of longitudinal shaft 230 in the monolithic structures while middle portions of link members 210, 220 are coupled to each other by a pin 403. The other ends 225 of link members 220 include openings 226 accommodating the insertion of pins 405 formed on extensions 204 of side plates 203 of cassette housing 200. Link 210 is coupled to extensions 204 of side plates 203 through a pin 404. A distance between the two pins 403, 404 is constant, while the distances between pin 403 and pins 401, 405 vary by movement of cassette housing 200 and link members 210, 220.

The pairs of link members 210, 220 move together with cassette housing 200 between an unloading position for allowing tape cassette 100 to be inserted into or released from cassette housing 200 and a loading position for allowing tape cassette 100 to be placed on deck 300 and be in a play back or record mode. During movement of cassette housing 200 in the direction of arrow B, pins 401, 405 slidably move within openings 212, 226, respectively, while link members 210, 220 rotate around pin 403. A resilient member 500, such as a spring, is connected between pins 207, 227 formed on side plate 203 of cassette housing 200 and the other end 225 of link member 220, respectively. The resilient member 500 is biased to pull the other end 225 of link member 220 toward cassette housing 200, and to enable link members 210, 220 to move in a direction opposite to arrow B and cassette housing 200 from the loading position to the unloading position.

When cassette housing 200 is lowered onto deck 300, each end 211, 221 of link members 210, 220 slidably moves in a direction for widening a distance between the two ends of each link member 210, 220. Pins 401 slidably move within openings 212 of the ends 211, 221 of link members 210, 220. Two link members 210, 220 rotate in opposite directions about pin 403 simultaneously. Pin 253 formed on extension 252 of side plate 251 slidably moves within opening 224 formed on the other end 223 of link member 220. Since link member 210 is integrally formed with longitudinal plate or shaft 230 in the monolithic structure, the structure of link member 220 does not cause the movement of link members 210, 220 and cassette housing 200, but prevents link members 210, 220 and cassette housing 200 from being distorted or weakened when an external impact is exerted on link members 210, 220 and cassette housing 200.

As described above, in the housing structure of a tape recorder constructed by the principle of the present invention, one of the link members supporting the cassette housing is integrally formed with a shaft in a single body, thereby reducing the number of components to be assembled into the housing structure and simplifying the assembling process of the housing structure.

What is claimed is:

1. A housing of a cassette recorder and player, comprising:
a deck having two sidewalls spaced apart from each other;
a cassette housing having two side plates disposed between said sidewalls for receiving insertion of a cassette, and for moving between a first position for placing said cassette on said deck and a second position for locating said cassette away from said deck;
a first link member having two side links joined by a longitudinal body in a monolithic structure, said side links being spaced apart from each other by a length of said longitudinal body, said side links having one end slidably connected to said it sidewalls, and said side links having a middle portion; and
two second link members spaced apart from each other, each being rotatably connected to the middle portion of a respective one of said side links of said first link member, and each having one end slidably connected to a respective one of said sidewalls of said deck and another end slidably connected to a respective one of said side plates of said cassette housing.

2. The housing of claim 1, said longitudinal body being spaced apart from said side plates of said cassette housing while said side links are coupled to said side plates of said cassette housing.

3. The housing of claim 1, said longitudinal body comprising two longitudinal plates extending from said longitudinal body of said first link member and bent inwardly to form a longitudinal opening between ends of said two longitudinal plates.

4. The housing of claim 1, said longitudinal body comprising a plate structure.

5. The housing of claim 1, wherein a thickness of said longitudinal plates is less than a width of said longitudinal body.

6. The housing of claim 1, wherein a sum of a thickness of said longitudinal plates and a thickness of said longitudinal body is less than a width of said longitudinal body.

7. The housing of claim 1, said longitudinal body of said first link member being spaced apart from said side plates of said cassette housing without penetrating said side plates of said cassette housing.

8. The housing of claim 1, wherein a thickness of said longitudinal body is substantially the same as a thickness of one of said side links.

9. Housing of a cassette recorder and player, comprising:
a deck having two sidewalls spaced apart from each other;
a cassette housing having two side plates providing a space in which to accommodate insertion of a cassette;
a first link member having two side links and a longitudinal body, said longitudinal body being spaced apart from said side plates of said cassette housing and coupled to ends of said side links, said side links being spaced apart from each other by a length of said longitudinal body, each of said side links having another end slidably connected to said sidewalls of said deck; and two second link members spaced apart from each other, each of said second link members being rotatably connected to a respective one of said side links of said first link member, each of said second link members having one end slidably connected to a respective one of said sidewalls of said deck and another end slidably connected to a respective one of said side plates of said cassette housing.

10. The housing of claim 9, said side links and said longitudinal body being integrally made in a monolithic structure.

11. The housing of claim 9, said longitudinal body comprising two longitudinal plates extending from said longitudinal body of said first link member and bent inwardly to form a longitudinal opening between ends of said two longitudinal plates.

12. The housing of claim 9, said longitudinal body comprising a plate structure.

13. The housing of claim 9, wherein said longitudinal body comprises two longitudinal plates having a thickness which is less than a width of said longitudinal body.

14. The housing of claim 9, wherein said longitudinal body comprises longitudinal plates, and wherein a sum of a thickness of said longitudinal plates and a thickness of said longitudinal body is less than a width of said longitudinal body.

15. The housing of claim 9, said longitudinal body of said first link member being spaced apart from said side plates of said cassette housing without penetrating said side plates of said cassette housing.

16. The housing of claim 9, wherein a thickness of said longitudinal body is substantially the same as a thickness of one of said side links.

17. A housing of a cassette player including a deck and a cassette housing for accommodating insertion of a cassette, comprising:

two side plates formed on said cassette housing;

a first link member having two side links joined by a longitudinal body, said side links being spaced apart from each other by a length of said longitudinal body, said side links having one end slidably connected to said deck and another end connected to said side plates of said cassette housing, said longitudinal body being spaced apart from said side plates of said cassette housing; and two second link members spaced apart from each other, and rotatably connected to each of said side links of said first link member, each of said second link members having one end slidably connected to said deck and another end slidably connected to a respective one of said side plates of said cassette housing;

wherein said side links and said longitudinal body are integrally made in a monolithic structure.

18. A housing of a cassette player including a deck and a cassette housing for accommodating insertion of a cassette, comprising:

two side plates formed on said cassette housing;

a first link member having two side links joined by a longitudinal body said side links being spaced apart from each other by a length of said longitudinal body, said side links having one end slidably connected to said deck and another end connected to said side plates of said cassette housing, said longitudinal body being spaced apart from said side plates of said cassette housing; and two second link members spaced apart from each other, and rotatably connected to each of said side links of said first link member, each of said second link members having one end slidably connected to said deck and another end slidably connected to a respective one of said side plates of said cassette housing;

said longitudinal body comprising two longitudinal plates extending from said longitudinal body of said first link member and bent inwardly to form a longitudinal opening between ends of said two longitudinal plates.

19. A housing of a cassette player including a deck and a cassette housing for accommodating insertion of a cassette, comprising:

two side plates formed on said cassette housing;

a first link member having two side links joined by a longitudinal body, said side links being spaced apart from each other by a length of said longitudinal body, said side links having one end slidably connected to said deck and another end connected to said side plates of said cassette housing, said longitudinal body being spaced apart from said side plates of said cassette housing; and two second link members spaced apart from each other, and rotatably connected to each of said side links of said first link member, each of said second link members having one end slidably connected to said deck and another end slidably connected to a respective one of said side plates of said cassette housing;

wherein said longitudinal body comprises longitudinal plates, and a thickness of said longitudinal plates is less than a width of said longitudinal body.

* * * * *